US 8,870,451 B2

(12) United States Patent
Mayer

(10) Patent No.: US 8,870,451 B2
(45) Date of Patent: Oct. 28, 2014

(54) CIRCUIT ARRANGEMENT FOR AN ELECTRIC SEAT HEATING MEANS

(75) Inventor: Werner Mayer, Reichertshofen (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/985,882

(22) PCT Filed: Feb. 13, 2012

(86) PCT No.: PCT/EP2012/000634
§ 371 (c)(1),
(2), (4) Date: Aug. 16, 2013

(87) PCT Pub. No.: WO2012/110224
PCT Pub. Date: Aug. 23, 2012

(65) Prior Publication Data
US 2013/0315282 A1    Nov. 28, 2013

(30) Foreign Application Priority Data
Feb. 16, 2011    (DE) .................... 10 2011 011 344

(51) Int. Cl.
*G01K 15/00*    (2006.01)
*G01K 7/00*    (2006.01)
*G01K 1/00*    (2006.01)
*G01K 13/00*    (2006.01)
*G01K 7/16*    (2006.01)
*H05B 1/02*    (2006.01)
*B60N 2/56*    (2006.01)

(52) U.S. Cl.
CPC ............... *G01K 7/16* (2013.01); *H05B 1/0238* (2013.01); *B60N 2/5685* (2013.01)
USPC ............... 374/1; 374/183; 374/185; 374/141

(58) Field of Classification Search
USPC ...................... 374/1, 141, 183, 185
See application file for complete search history.

(56) References Cited

U.S. PATENT DOCUMENTS 5,288,974 A * 2/1994 Hanzic .................... 219/501
6,278,090 B1 * 8/2001 Fristedt et al. ............ 219/497

(Continued)

FOREIGN PATENT DOCUMENTS

DE    19811823    9/1999
DE    102006030337    1/2008

(Continued)

OTHER PUBLICATIONS

Translation of CN 2691931 Y (Apr. 13, 2005).*

(Continued)

*Primary Examiner* — Mirellys Jagan
(74) *Attorney, Agent, or Firm* — Staas & Halsey LLP

(57) ABSTRACT

An electrical seat heater of a vehicle has a heating resistor which is connected to a seat ground cable has a temperature-dependent sensor resistor in the vehicle seat. A control unit is outside the vehicle seat is connected to a control unit ground remotely from the vehicle seat. The voltage measurement for determining the temperature is carried out with the seat heater briefly disconnected from the supply voltage. The heating resistor is connected to the supply voltage via a series circuit including the sensor resistor and a further resistor or to the supply voltage via a power path. The control unit measures the voltage drop at the sensor resistor by a measuring signal cable. The control unit measures the potential difference between the seat ground cable and the control unit ground, which is used to correct the seat temperature.

9 Claims, 1 Drawing Sheet

(56) References Cited

U.S. PATENT DOCUMENTS

| | | | |
|---|---|---|---|
| 2003/0024924 A1* | 2/2003 | Fristedt | 219/497 |
| 2013/0020305 A1* | 1/2013 | Lamesch et al. | 219/217 |
| 2014/0138992 A1* | 5/2014 | Feng et al. | 297/180.12 |

FOREIGN PATENT DOCUMENTS

| | | |
|---|---|---|
| DE | 102011011344.4 | 2/2011 |
| WO | WO 2007/018271 A1 | 2/2007 |
| WO | PCT/EP2012/000634 | 2/2012 |

OTHER PUBLICATIONS

Translation of CN 101461617 A (Jun. 24, 2009).*
Translation of CN 101108595 A (Jan. 23, 2008).*
Translation of DE 19811823 B4 (Sep. 16, 2014).*
English Language International Search Report for PCT/EP2012/000634, mailed May 8, 2012, 2 pages.
English language translation of International Preliminary Report on Patentability for PCT/EP2012/000634, issued Aug. 21, 2013, 6 pages.
Office Action mailed Jun. 5, 2014 for corresponding Chinese Patent Application No. 201280001148.6.

* cited by examiner

CIRCUIT ARRANGEMENT FOR AN ELECTRIC SEAT HEATING MEANS

CROSS REFERENCE TO RELATED APPLICATIONS

This application is based on and hereby claims priority to International Application No. PCT/EP2012/000634 filed on Feb. 13, 2012 and German Application No. 10 2011 011 344.4 filed on Feb. 16, 2011, the contents of which are hereby incorporated by reference.

BACKGROUND

The invention relates to a circuit arrangement for an electrical seat heater of a vehicle.

Known circuit arrangements for electrical seat heaters in vehicles have a heating element in the form of a heating resistor and a temperature-dependent sensor resistor which is connected to measuring electronics in order to determine the seat temperature. A circuit arrangement of this kind is disclosed in DE 198 11 823 B4. With this known circuit arrangement, the sensor resistor and the heating resistor are connected to the same ground potential in the region of the vehicle seat. The control unit, which is remote from the vehicle seat and which contains the measuring electronics, does not have a ground connection to the seat ground to which the sensor resistor and the heating resistor are connected. The control unit is connected to another ground which is remote from the vehicle seat. A so-called ground offset, which can easily lie in the range of +/−1 Volt, regularly occurs with ground connections which are remote from one another in this way. The measurement at the sensor resistor is falsified by this ground offset so that an exact determination of the temperature is not possible with the known circuit arrangement.

SUMMARY

One possible object is to specify a circuit arrangement for an electrical seat heater of a vehicle which enables little cable to be expended between vehicle seat and control unit and, at the same time, has a high measuring accuracy for the determination of the seat temperature.

The inventor proposes a circuit device for an electrical heater of a vehicle seat, the heater having a heating resistor connected to a supply voltage via a power path and connected to a seat ground cable in a region of the vehicle seat. The circuit device has a temperature-dependent sensor resistor positioned in the vehicle seat; a control unit positioned outside of the vehicle seat, the control unit being connected to a control unit ground that is positioned remotely from the vehicle seat, to activate the heating resistor and to determine a seat temperature; a series circuit comprising the sensor resistor and a further resistor to connect the heating resistor to the supply voltage, such that the heating resistor can be connected to the supply voltage either via the series circuit or via the power path; and a measuring signal cable through which the control unit measures a voltage drop at the sensor resistor when the heating resistor is disconnected from the supply voltage, the control unit storing the voltage drop as a voltage measurement. The control unit measures a potential difference between a potential of the seat ground cable and a potential of the control unit ground. The control unit takes the potential difference into account in order to correct the voltage measurement, produce a corrected voltage measurement, and determine the seat temperature from the corrected voltage measurement.

According to the proposal, on the one hand, the heating resistor can be connected to the supply voltage via a sensor resistor and a further resistor and, on the other hand, via a power path, wherein the control unit for determining the seat temperature measures not only the voltage drop at the sensor resistor but also the potential difference between the potential of the seat ground cable to which the heating resistor is connected and the potential of the control unit ground to which the control unit is connected. With ground points of this kind which are arranged far apart from one another in the vehicle, the potential difference can lie in a range of approximately +/−1 Volt and, in the present case, is taken into account in the determination of the seat temperature in the form of a correction value for the voltage drop measured at the setpoint resistor. This provides a very accurate measurement for determining the seat temperature, wherein no ground connecting cable is required between the control unit and the ground cable in the region of the driver's seat. A cable connection to the temperature-dependent sensor resistor which serves as a pure measuring cable and a cable connection to the heating resistor which serves as a power path are therefore sufficient for the cable connections between the control unit and the driver's seat.

A particularly advantageous embodiment provides that the control unit has a first and a second measuring input, that the measuring signal cable leading to the sensor resistor is connected to the first measuring input, and that the second measuring input is connected to the electrical connection between sensor resistor and heating resistor and measures the potential difference between the control unit ground and the seat ground cable when the seat heater is switched off. The measurement is carried out using a high-impedance input of the measuring electronics contained in the control unit so that the extremely low-impedance heating resistor has practically no effect on the potential measurement. The resistance value of the heating resistor namely lies approximately in a range between 1 to 3 ohms.

Another possibility for determining the potential difference between the seat ground cable and the control unit ground provides that, when measuring the potential difference between seat ground cable and control unit ground, the heating resistor and the sensor resistor are disconnected from the supply voltage and a high-impedance measuring input of a measuring device located in the control unit measures the potential of the seat ground cable with respect to the control unit ground by the signal cable which is connected to the temperature-dependent sensor resistor. This results in a lower circuit complexity.

According to an improvement, the supply voltage can be connected to the heating resistor by a first electrical switch and to the signal cable leading to the temperature-dependent sensor resistor by a second electrical switch, wherein both electrical switches can be actuated by the control unit. The first electrical switch actuates the power path, for which reason a power transistor is provided as an electrical switch for this purpose. The second electrical switch is also preferably in the form of a transistor, which results in a cost-effective overall design for the overall circuit arrangement.

If the circuit arrangement is equipped with a high-impedance pull-down resistor (stabilizing resistor), for example for stabilizing voltage states in the region of the measuring input of the measuring electronics, then, in order to improve the measuring result when measuring the potential at the seat ground cable, it can be expedient to disconnect this pull-down resistor while measuring the potential.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
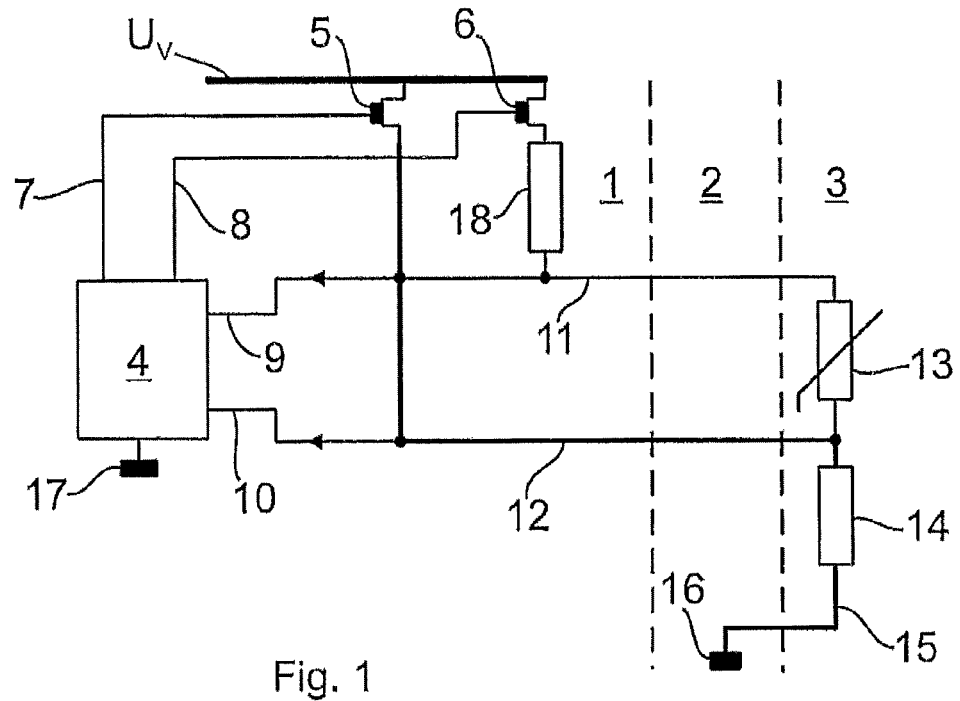
FIG. 1 shows a circuit arrangement with a measuring device which has two measuring inputs.

Reference will now be made in detail to the preferred embodiments of the present invention, examples of which are illustrated in the accompanying drawings, wherein like reference numerals refer to like elements throughout.

The circuit arrangement shown in FIG. 1 is divided by vertical dotted lines into three regions which contain the control unit 1, a cable loom 2 and a vehicle seat 3. Measuring electronics 4, which are connected by control cables 7, 8 to switching transistors 5, 6, are contained in the control unit 1. In addition, the measuring electronics 4 have two measuring inputs 9, 10 which, on the one hand, are connected to a measuring signal cable 11 and, on the other hand, to a power path 12. The measuring signal cable 11 leads to a temperature-dependent sensor resistor 13 which, in the exemplary embodiment, is in the form of an NTC resistor, the temperature-dependent resistance value of which is 1 kohm at 80° C. and 8 kohm at 25° C. With regard to the measuring signal cable 11, the sensor resistor 13 is connected via a series-connected heating resistor 14 and via a seat ground cable 15 to a ground point 16 in the region of the vehicle seat 3. The ground point 16 can also be referred to as the seat ground.

The measuring electronics 4 of the control unit 1 are connected to a control unit ground 17 which is remote from the ground point 16. With ground points of this kind which are arranged remotely, potential differences occur in a vehicle, i.e. the ground potential between two remote ground points of this kind can easily differ from one another by +/−1 Volt.

The control unit 1 can actuate the two switching transistors 5, 6 via the measuring electronics 4 in order to connect the supply voltage $U_V$ to the power path 12 via the switching transistor 5 or to the measuring signal cable 11 via the switching transistor 6 and a resistor 18. In the normal heating mode, the switching transistor 5 is switched to a conducting state and therefore connects the supply voltage $U_V$ to the heating resistor 14 via the power path 12. To now carry out a measurement of the seat temperature, the switching transistor 5 is blocked by the measuring electronics 4 and the switching transistor 6 is switched to a conducting state so that the series circuit comprising the resistors 18, 13, 14 is connected to the supply voltage $U_V$. In the exemplary embodiment shown, the resistor 18 can have a resistance value of 10 kohm, thus resulting in a voltage drop at the sensor resistor 13 which is dependent on the seat temperature. The voltage drop measured at the sensor resistor 13 in each case is stored as a measurement in the measuring electronics 4.

With the second measuring input 10, the measuring electronics 4 now measure the ground potential at the seat ground cable 15 or at the ground point 16 with respect to the control unit ground 17 via the very-low-impedance heating resistor 14. The ground potential measured represents the potential difference between the ground point 16 and the control unit ground 17. This potential difference can also be referred to as the ground offset and must now be subtracted from the voltage drop measured across the measuring signal cable 11 at the sensor resistor 13, thus resulting in a corrected measurement for determining the seat temperature. From this corrected measurement, based on a stored measurement characteristic which is stored for the used sensor resistor 13, the measuring device 4 can now read out the associated temperature value for determining the seat temperature and use it for controlling the temperature in a manner which is known per se. When a required seat temperature is reached, the control unit 1 or its measuring electronics 4 disconnects the power path 12 from the supply voltage $U_V$ by the switching transistor 5. When the seat temperature falls below a specified threshold once more, the power path 12 is reconnected to the supply voltage $U_V$.

Figure 2:
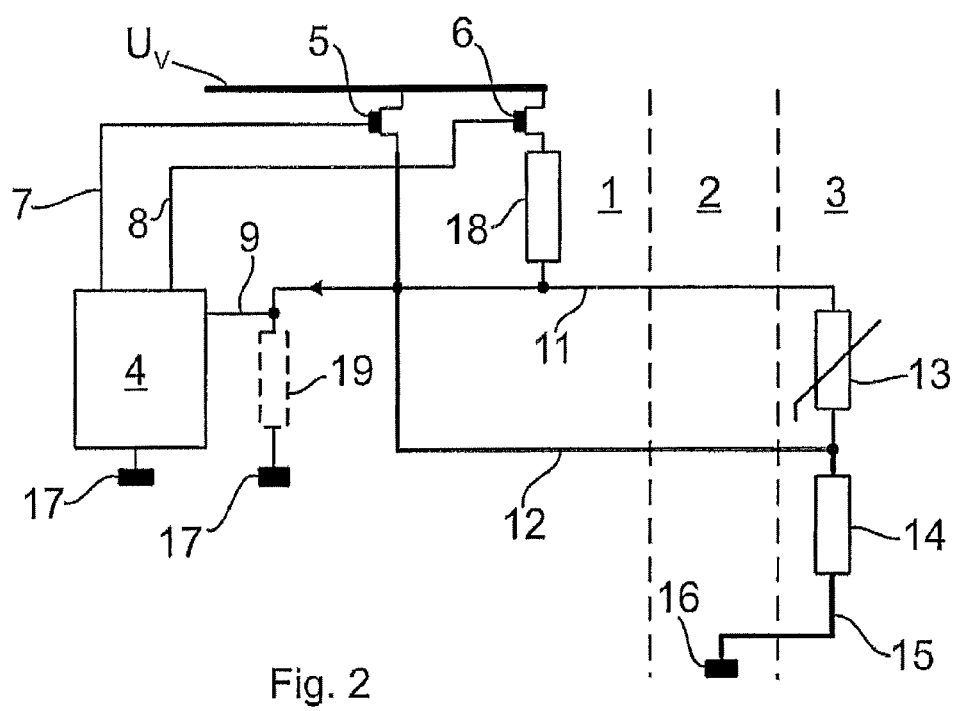
FIG. 2 shows a circuit arrangement, the measuring device of which has a single measuring input.

Extensively the same components and electronics as in FIG. 1 are used in the switching arrangement of FIG. 2, and for this reason the same reference numbers are used here. However, in this second exemplary embodiment, the measuring electronics 4 have only one measuring input 9 which is connected via a pull-down resistor 19 (stabilizing resistor) to the control unit ground 17. The pull-down resistor 19 is shown with dotted lines, as although this can be expedient from a circuit point of view, it is not necessary for the actual function or for understanding the circuit arrangement.

In this second exemplary embodiment, the voltage drop is first measured at the sensor resistor 13 in order to determine the temperature as in the exemplary embodiment of FIG. 1. In doing so, the switching transistor 6 is switched to a conducting state. However, in order to determine the ground offset between the control unit ground 17 and the ground point 16, in FIG. 2 the switching transistor 6 is now blocked by the measuring device 4 via the control input 8 so that the ground potential at the ground point 16 is measured by the high-impedance measuring input 9 via the two series-connected resistors 13, 14. In doing so, it can be expedient to disconnect the pull-down resistor 19 from the measuring input 9 by an electrical switch, which is not shown here, in order to prevent the measuring result possibly being influenced by this pull-down resistor 19.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A circuit device for an electrical heater of a vehicle seat, the heater having a heating resistor connected to a supply voltage via a power path and connected to a seat ground cable in a region of the vehicle seat, the circuit device comprising:
    a temperature-dependent sensor resistor positioned in the vehicle seat;
    a control unit positioned outside of the vehicle seat, the control unit being connected to a control unit ground that is positioned remotely from the vehicle seat, to activate the heating resistor and to determine a seat temperature;
    a series circuit comprising the sensor resistor and a further resistor to connect the heating resistor to the supply voltage, such that the heating resistor can be connected to the supply voltage either via the series circuit or via the power path; and
    a measuring signal cable through which the control unit measures a voltage drop at the sensor resistor when the heating resistor is disconnected from the supply voltage, the control unit storing the voltage drop as a voltage measurement, wherein
    the control unit measures a potential difference between a potential of the seat ground cable and a potential of the control unit ground, and the control unit takes the potential difference into account in order to correct the voltage measurement, produce a corrected voltage measurement, and determine the seat temperature from the corrected voltage measurement.

2. The circuit device according to claim 1, wherein
a first electrical switch is used to connect the supply voltage to an electrical connection between sensor resistor and the heating resistor,
the heating resistor and the sensor resistor are connected in series,
the further resistor is connected to the signal cable,
a second electrical switch connects the heating resistor and the sensor resistor to the supply voltage via the further resistor, and
both the first and second electrical switches are activated by the control unit.

3. The circuit device according to claim 1, wherein
the control unit has first and second measuring inputs,
the measuring signal cable leads to the sensor resistor for measurement of the voltage drop,
the measuring signal cable is connected to the first measuring input,
the second measuring input is connected to an electrical connection between the sensor resistor and the heating resistor,
the potential difference is measured when the heating resistor is disconnected from the supply voltage, and
the control unit uses the second measuring input to measure the potential difference.

4. The circuit device according to claim 3, wherein
a first electrical switch is used to connect the supply voltage to the electrical connection between sensor resistor and the heating resistor,
the series circuit comprises the heating resistor, the sensor resistor and the further resistor connected in series, the sensor resistor being connected to the further resistor via the signal cable,
a second electrical switch connects the heating resistor to the supply voltage via the series circuit, the second electrical switch being connected between the further resistor and the supply voltage, and
both the first and second electrical switches are activated by the control unit.

5. The circuit device according to claim 4, wherein
a high-impedance pull-down resistor is positioned at the first measuring input, and
the high-impedance pull-down resistor is disconnected when the potential difference is measured.

6. The circuit device according to claim 1, wherein
when measuring the potential difference, the heating resistor and the sensor resistor are disconnected from the supply voltage, and
a high-impedance measuring input of a measuring device located in the control unit measures the potential difference using the measuring signal cable.

7. The circuit device according to claim 6, wherein
a high-impedance pull-down resistor is positioned at the first measuring input, and
the high-impedance pull-down resistor is disconnected when the potential difference is measured.

8. The circuit device according to claim 6, wherein
a first electrical switch is used to connect the supply voltage to an electrical connection between sensor resistor and the heating resistor,
the series circuit comprises the heating resistor, the sensor resistor and the further resistor connected in series, the sensor resistor being connected to the further resistor via the signal cable,
a second electrical switch connects the heating resistor to the supply voltage via the series circuit, the second electrical switch being connected between the further resistor and the supply voltage, and
both the first and second electrical switches are activated by the control unit.

9. The circuit device according to claim 8, wherein
a high-impedance pull-down resistor is positioned at the first measuring input, and
the high-impedance pull-down resistor is disconnected when the potential difference is measured.

\* \* \* \* \*